March 21, 1939.   E. J. HOUDRY   2,150,924
PROCESS OF CATALYSIS
Filed April 18, 1935
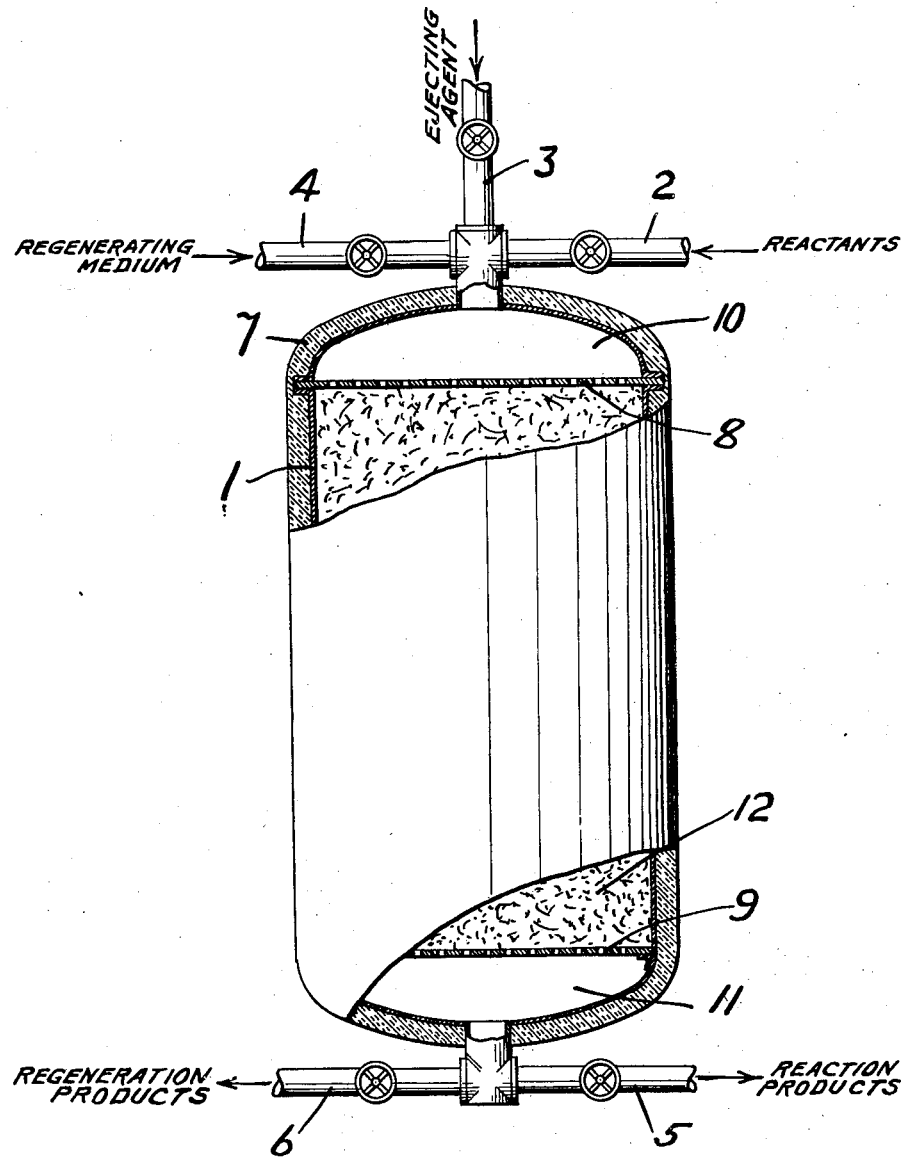
INVENTOR
Eugene J. Houdry
BY
Ira L. Nickerson
ATTORNEY.
WITNESS:

Patented Mar. 21, 1939

2,150,924

UNITED STATES PATENT OFFICE 2,150,924

PROCESS OF CATALYSIS

Eugene J. Houdry, Philadelphia, Pa., assignor to Houdry Process Corporation, Dover, Del., a corporation of Delaware Application April 18, 1935, Serial No. 17,137

3 Claims. (Cl. 196—52)

This invention relates to the use of adsorptive catalysts in the synthesis, the transformation, the decomposition or other treatment of substances in a gaseous condition, and is a continuation in part of my copending application Serial No. 512,301, filed in the United States Patent Office on January 30, 1931, under the name of Eugene Houdry.

Various contact materials, in a highly divided state, including compounds such as silicates and oxides, for example, silicates of alumina and oxides of metals, as well as the metals themselves, are known to have the power of promoting reactions in or between gases, through their adsorptive, catalytic action or contact, and practical use of this power has been made in certain manufacturing operations such, for example, as the manufacture of sulphuric acid. In other fields of manufacture, however, notably in the conversion and refining of mineral oils, the use of a contact mass or catalyst for operation upon materials in gaseous phase has not had the degree of commercial success hoped for, notwithstanding the known fact that catalysts are capable of promoting the desired reactions upon materials in liquid phase, under conditions of high temperature and pressure.

It has been realized, theoretically, that catalysts of highly adsorbent character should be capable of promoting similar reactions under conditions of relatively low temperature and pressure, and this mode of operation is highly desirable for technical reasons which will be obvious. When attempts in this direction have been made, however, it has often been found, upon feeding the material to the contact or catalytic mass, that little, if any, of the desired product emerged from the mass. In some cases, such as the conversion of higher boiling hydrocarbons by means of highly adsorbent catalytic masses, a certain measure of success has been attained, but the period of production has been either so short or entirely lacking that real commercial success has not been satisfactorily achieved.

I have discovered that the failure, in many such cases, has not been due, as heretofore supposed, to the failure of the catalyst or contact mass to produce the desired reaction, but to the fact that the product, although actually produced in such mass, remains adsorbed therein, being displaced either with difficulty, or not at all, by the incoming raw material. The problem, therefore, in such cases, is not so much the discovery of a suitable mass or catalyst, as the provision of means for expelling the product from the mass to make way for fresh material. The periods of expulsion of fluid products of reaction from the catalyst or adsorptive mass are, of course, an operation distinct and apart from the occasional or periodic reactivation or regeneration of the catalyst to remove therefrom solid or combustible deposits, which accumulate on the mass during the period in which reactant fluids are being converted into desired fluid products.

I have discovered further that the adsorbed product may be expelled from the adsorbent contact mass or catalyst by the use of some material, in gaseous form, for which the mass has a stronger affinity than it has for the products of the desired reaction. Such material is, preferably, chemically inactive with respect to the material treated by the mass, as it has no essential part in the process and serves merely as a purgative for the mass. The purgative agent may be inert to or have a chemical affinity for the mass or catalyst, according to the disclosure of my aforesaid copending application, but the aspect of the original disclosure relating to chemical interaction between the purging agent and the catalyst is set forth in my copending application Serial No. 17,136, filed of even date herewith as a continuation in part of application Serial No. 512,301. The invention disclosed herein resides, then, in the use of an agent in the nature of an inert purgative which is introduced to the catalytic mass to enhance the effective adsorptive affinity thereof for the fluid material which is to be treated relative to the fluid products of reaction. The introduction of the agent may be made intermittently or simultaneously with the vaporous or gaseous reactant fluid.

In a word, the present invention is drawn to a process of catalysis or contacting wherein the effective adsorptive affinity of the contact mass for fluid reactants, relative to fluid products of reaction, is increased or enhanced by the use of a suitable inert gaseous agent or purgative such as steam, for example, employed under such conditions that there will be no substantial reaction between the gaseous agent or purgative, on the one hand, and the reactants, reaction products or contact mass, on the other; while my copending application, Serial No. 17,136, is drawn to a process having in general the same ultimate objects where the adsorptivity of the contact mass is destroyed or substantially diminished (e. g. by effecting a chemical interaction between the gaseous agent and the mass, as for example, converting an adsorbent metal catalyst to a non-adsorbent sulfide form) as a means of releasing adsorbed fluid products of reaction and then the adsorptivity of such mass, or of minute particles thereof, as the case may be, is restored.

A useful application of the present invention is in the conversion or modification of mineral oil and its derivatives in the production of motor fuel and other products. For such operations, the mineral oil is treated, for example, at pressures ranging from atmospheric to 250 pounds per square inch and at temperatures from 450° to about 900° F. by a catalytic or contact mass comprising bodies of highly adsorbent or activated silicates of alumina or clayey materials, such as activated hydrosilicate of alumina, either alone or with the addition of nickel oxide, alumina or other material, for determining the direction of the reaction. In many of such operations, the transformed product is adsorbed equally or more strongly than the charged or raw material, so that the desired products tend to remain within the contact mass and continuous feeding of the charge results in such a small amount of transformation that it is uneconomical. In such cases, steam is a good purgative, since it is adsorbed in such a catalytic mass more strongly than some or all of the converted product, and in several instances more strongly than the fresh feed or material to be catalyzed, except when the latter is composed of heavy or high boiling hydrocarbons. When heavy hydrocarbons are being transformed into lighter products in the gasoline boiling range, it is frequently advantageous to add steam to the charge for its purgative action in ejecting the lighter materials, as fast as they are made, from the catalytic mass. However, when natural or "straight run" gasoline is being converted into motor fuel of similar boiling range, but having improved antiknock qualities, some constituents of the raw material are less strongly adsorbed by the catalyst than others, and a purgative such as steam, when introduced with the raw material, tends to prevent complete adsorption of the latter. In such instances, an alternate or intermittent operation is adopted. The raw material is introduced alone for a suitable period or until the catalytic mass is saturated with products of reaction, (for example, for a period of 30 seconds or less to five minutes or more, depending upon the raw material charged and the product desired and depending upon the catalyst and rate of feed employed, as well as upon other conditions) the feed of raw material is then stopped, and the purgative agent, such as steam, is then fed to the catalyst, thus expelling the converted material. The catalyst is then subjected to a vacuum to remove the adsorbed water vapor. The cycle of operations may then be repeated a plurality of times, as for example, 10, 25, 50 or more times, between periods of regeneration with an oxygen-containing regenerating fluid.

Another example of intermittent operation is available in the polymerization of hydrocarbon gases, such as natural gas or artificial or refinery fixed gas. A charge consisting of a mixture of propane and butane fractions containing approximately 25% of unsaturates was fed to a catalytic mass of the above described type maintained at a temperature of about 495° F. until a pressure of about 75 pounds per square inch had been built up. The feeding of the charging mixture was then stopped and the mass was purged with steam to free the same of adsorbed material. It was found that polymerization had been effected to the extent of 94% of the unsaturates contained in the charge. The adsorbed water vapor was removed by vacuum and the cycle of operations was continued.

For the synthesis of ammonia, mixed nitrogen and hydrogen in the proper proportion were charged to a converter containing catalyst made up of a clay base containing 20% by weight of iron which had been added to the base as a hydrate and thereafter reduced by the action of heat. The temperature was in the range of 700 to 800° F. and the pressure 300 pounds per square inch. Steam was sent into the mass as an ejecting agent at five minute intervals after stopping the feed of reactants to remove the ammonia.

It will be understood that the invention is not limited in its essentials to operations involving the conversion of hydrocarbons or to the use of the particular purgative substance specifically referred to, but that it is susceptible of application in principle to catalytic operations involving a wide range of materials. I am aware that it has previously been proposed to introduce water vapor into hydrocarbons in connection with catalytic operations but for the purpose of utilizing the water as a source of oxygen and hydrogen. Such use involves high reaction temperatures necessary to cause disassociation of the water and the decomposition of the water is inconsistent with its performance of the function of a purgative.

Apparatus for practising the processes disclosed herein may vary widely in form, but, in its essentials, is quite simple as indicated by the single figure of the accompanying drawing which is partly in elevation and partly in section. It merely involves a converter 1 with suitable connections 2, 3 and 4 for feeding thereto the material to be catalyzed, the ejecting agent, and the regenerating medium respectively; there is also outlet connection 5 for removing the desired transformed products and the ejecting agent and another outlet connection 6 for the products of regeneration, together with suitable valves and controls for all such connections. Converter 1 may have its exterior covered by a layer of heat insulating material 7 and may have, on its interior, upper and lower perforated partitions or grids 8 and 9. These partitions divide the interior of the converter into end manifolding chambers 10 and 11 and a large central reaction chamber in which the catalytic or contact material 12 is disposed. Suitable apparatus is also shown in my copending application Serial No. 604,997, filed April 13, 1932 which issued March 16, 1937 as Patent No. 2,073,638.

I claim as my invention:

1. In the transformation of fluids with an adsorptive contact or catalytic mass, adapted periodically to be reactivated for the removal of solid contaminants, wherein vaporous products of changed chemical nature are produced, the method of improving the production of the desired fluid products which comprises passing fluid reactants into said catalytic mass for a short period of time, then interrupting passage of the reactants into said mass and introducing thereinto steam as a purging fluid capable of effecting the release of adsorbed fluid products of reaction from said mass without deleteriously affecting such products and without substantially affecting or altering the chemical character of said contact mass; after release of said adsorbed fluid products, withdrawing from said mass purging fluid which is retained therein; and then again bringing fluid reactants into contact with said mass, and repeating the above operations a plurality of times between consecutive periods of reactivation of said catalytic mass to remove solid contaminants therefrom.

2. In the chemical transformation of hydrocarbon fluid with an adsorptive contact or catalytic mass, adapted periodically to be reactivated in situ to remove solid deposits therefrom and composed essentially of materials from the group consisting of silicates of alumina and clayey materials, wherein a hydrocarbon fluid product of changed characteristics results, said fluid product being substantially completely in vapor phase under the conditions of the reaction, the method of improving the production of desired resultant hydrocarbon fluid by enhancing the effective adsorptive affinity of the contact mass for the reactant fluid relative to the fluid products of reaction which comprises intermittently interrupting the supply of reactant fluid to the mass and introducing into the said contact mass steam as an inert fluid material under conditions including temperature so that there will be no substantial reaction between said inert fluid and said catalytic mass, nor any deleterious reaction between said inert fluid material, on the one hand, and reactants and reaction products, on the other, said inert fluid being capable of purging adsorbed hydrocarbon products of reaction from said mass without deleteriously affecting the same, so as to enhance the adsorptivity of said contact mass for the reactant hydrocarbon fluid; after release of adsorbed vaporous hydrocarbon products from said contact mass, withdrawing retained purging fluid from said mass by applying a vacuum thereto; then again passing fluid hydrocarbon reactants into said contact mass, and repeating the above steps of process a plurality of times between consecutive periods of reactivation of said mass to remove solid deposits therefrom.

3. In the treatment of a low boiling hydrocarbon fluid with an adsorptive contact mass, comprising materials from the group consisting of silicates of alumina and clayey materials and adapted periodically to be reactivated in situ to remove solid deposits therefrom, wherein a hydrocarbon fluid of changed characteristics but substantially similar boiling range results, the method of improving the production of the desired resultant hydrocarbon fluid by enhancing the effective adsorptive affinity of the contact mass for the reactant fluid relative to the fluid products of reaction which comprises intermittently interrupting the passage of reactant fluid to said mass and introducing steam thereinto under conditions including temperatures so that there will be no substantial reaction between the steam, or the one hand, and reactants, reaction products or contact mass, on the other, the steam being capable of purging fluid products of reaction from said contact mass so that the adsorptivity of said mass for said reactant fluid will be enhanced; after the release of adsorbed vaporous hydrocarbon products from said contact mass, withdrawing retained steam from said mass; again introducing reactant hydrocarbon fluid into said contact mass; and repeating the above operations a plurality of times in sequence.

EUGENE J. HOUDRY.